(12) United States Patent
Park et al.

(10) Patent No.: US 10,479,346 B2
(45) Date of Patent: Nov. 19, 2019

(54) HYBRID VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Daero Park, Hwaseong-si (KR); Woon Ki Cho, Suwon-si (KR); Seok Young Yun, Yongin-si (KR); Taehyuck Kim, Seoul (KR); Ji Hoon Kang, Seoul (KR); Dong Gu Han, Hwaseong-si (KR); Junyoung Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 345 days.

(21) Appl. No.: 15/379,339

(22) Filed: Dec. 14, 2016

(65) Prior Publication Data

US 2018/0099655 A1 Apr. 12, 2018

(30) Foreign Application Priority Data

Oct. 6, 2016 (KR) .................. 10-2016-0129209

(51) Int. Cl.
*B60W 30/00* (2006.01)
*B60W 20/15* (2016.01)
(Continued)

(52) U.S. Cl.
CPC ............... *B60W 20/15* (2016.01); *B60K 6/26* (2013.01); *B60K 6/28* (2013.01); *B60K 6/387* (2013.01); *B60K 6/48* (2013.01); *B60K 17/02* (2013.01); *B60L 3/0023* (2013.01); *B60W 10/06* (2013.01); *B60W 10/08* (2013.01); *B60W 10/113* (2013.01); *B60W 30/186* (2013.01); *F16H 57/0412* (2013.01); *F16H 57/0416* (2013.01); *F16H 57/0473* (2013.01);
(Continued)

(58) Field of Classification Search
None
See application file for complete search history.

(56) References Cited

U.S. PATENT DOCUMENTS 6,463,821 B1* 10/2002 Reed, Jr. ............... F16D 21/06
192/103 C
6,715,597 B1* 4/2004 Buchanan ............. F16D 25/123
192/113.35
(Continued)

FOREIGN PATENT DOCUMENTS

JP 2796598 B2 7/1998
JP 2005-319910 A 11/2005
(Continued)

*Primary Examiner* — Jonathan M Dager
(74) *Attorney, Agent, or Firm* — Knobbe Martens Olson & Bear LLP

(57) ABSTRACT

The present disclosure relates to a hybrid vehicle and a method of controlling the same. The hybrid vehicle includes a battery configured to store electrical energy, a motor configured to rotate using the electrical energy, a transmission including a first clutch and a second clutch that are connectable to the motor, and a controller configured to control rotation of the motor to cool the transmission when the transmission is determined to be in an overheated state.

17 Claims, 9 Drawing Sheets

(51) Int. Cl.
  *B60K 6/26* (2007.10)
  *B60K 6/28* (2007.10)
  *B60K 6/387* (2007.10)
  *B60K 6/48* (2007.10)
  *B60K 17/02* (2006.01)
  *B60W 10/06* (2006.01)
  *B60W 10/08* (2006.01)
  *F16H 57/04* (2010.01)
  *B60L 3/00* (2019.01)
  *B60W 10/113* (2012.01)
  *B60W 30/186* (2012.01)

(52) U.S. Cl.
  CPC ............... *B60K 2006/268* (2013.01); *B60K 2006/4825* (2013.01); *B60L 2240/485* (2013.01); *B60W 2510/107* (2013.01); *B60W 2510/244* (2013.01); *B60W 2710/021* (2013.01); *B60W 2710/0644* (2013.01); *B60W 2710/08* (2013.01); *B60W 2710/081* (2013.01); *B60W 2710/1005* (2013.01); *B60Y 2200/92* (2013.01); *B60Y 2306/05* (2013.01); *Y10S 903/93* (2013.01)

(56) References Cited

U.S. PATENT DOCUMENTS

| | | | | |
|---|---|---|---|---|
| 8,167,774 B2* | 5/2012 | Jaeggle | F16H 61/12 | 477/174 |
| 8,700,242 B2* | 4/2014 | Kanamori | B60K 6/48 | 701/22 |
| 8,827,868 B2* | 9/2014 | Tao | F16H 61/688 | 477/174 |
| 8,862,354 B2* | 10/2014 | Hebbale | F16H 59/72 | 165/287 |
| 8,897,979 B2* | 11/2014 | Hebbale | F16D 48/06 | 701/67 |
| 8,965,628 B2* | 2/2015 | Brevick | F02M 31/04 | 701/36 |
| 9,026,295 B2* | 5/2015 | Inoue | B60W 20/40 | 701/22 |
| 9,223,325 B2* | 12/2015 | Hensley | G06F 1/206 | |
| 9,695,888 B2* | 7/2017 | Cho | F16D 48/06 | |
| 9,919,698 B2* | 3/2018 | Tajima | B60K 6/48 | |
| 2001/0025759 A1* | 10/2001 | Sarar | F16D 13/72 | 192/48.8 |
| 2004/0069546 A1* | 4/2004 | Lou | B60K 6/22 | 180/65.21 |
| 2005/0283298 A1* | 12/2005 | Ochi | B60W 10/02 | 701/67 |
| 2006/0004506 A1* | 1/2006 | Stehle | B60W 10/02 | 701/67 |
| 2006/0040788 A1* | 2/2006 | Bassler | F16D 48/062 | 477/71 |
| 2006/0240939 A1* | 10/2006 | Foster | F16H 57/0413 | 477/3 |
| 2007/0202989 A1* | 8/2007 | Ortmann | B60K 6/387 | 477/166 |
| 2008/0103003 A1* | 5/2008 | Sah | B60W 20/30 | 475/5 |
| 2008/0154455 A1* | 6/2008 | Hidaka | B60K 6/48 | 701/22 |
| 2009/0082154 A1* | 3/2009 | Iwase | B60K 6/445 | 475/150 |
| 2009/0118086 A1* | 5/2009 | Heap | B60W 10/06 | 477/5 |
| 2009/0258755 A1* | 10/2009 | Kimura | B60W 10/08 | 477/107 |
| 2010/0113216 A1* | 5/2010 | Avny | F16D 13/72 | 477/76 |
| 2010/0200357 A1* | 8/2010 | Okabe | F16D 48/066 | 192/30 W |
| 2010/0250080 A1* | 9/2010 | Domae | F16D 48/06 | 701/68 |
| 2011/0024258 A1* | 2/2011 | Avny | F16D 13/72 | 192/111.12 |
| 2011/0154945 A1* | 6/2011 | Mohlin | F16H 3/006 | 74/665 D |
| 2011/0218719 A1* | 9/2011 | Kirchner | B60W 10/02 | 701/53 |
| 2011/0284309 A1* | 11/2011 | Gooden | B60H 1/14 | 180/339 |
| 2012/0078480 A1* | 3/2012 | Diemen | F16D 21/06 | 701/60 |
| 2012/0085511 A1* | 4/2012 | Park | B60K 11/02 | 165/51 |
| 2012/0173103 A1* | 7/2012 | Barbir | F16D 48/06 | 701/67 |
| 2012/0191306 A1* | 7/2012 | Baldwin | F16D 13/72 | 701/51 |
| 2012/0290248 A1* | 11/2012 | Hebbale | F16D 48/06 | 702/130 |
| 2013/0103242 A1* | 4/2013 | Takeuchi | B60K 6/36 | 701/22 |
| 2013/0112030 A1* | 5/2013 | Feldt | F16H 57/0446 | 74/473.11 |
| 2013/0231833 A1* | 9/2013 | Burtch | B60W 10/02 | 701/67 |
| 2013/0282243 A1* | 10/2013 | Tao | F16H 61/12 | 701/54 |
| 2013/0282246 A1* | 10/2013 | Burtch | F16H 61/688 | 701/67 |
| 2013/0282247 A1* | 10/2013 | Burtch | F16D 48/062 | 701/67 |
| 2014/0018209 A1* | 1/2014 | Dodo | F16D 48/08 | 477/176 |
| 2014/0106927 A1* | 4/2014 | Gibson | F16D 28/00 | 477/5 |
| 2014/0129067 A1* | 5/2014 | Furukawa | B60K 6/442 | 701/22 |
| 2014/0163827 A1* | 6/2014 | Kim | B60W 10/11 | 701/54 |
| 2014/0171261 A1* | 6/2014 | Haneda | B60K 6/42 | 477/5 |
| 2014/0228168 A1* | 8/2014 | Kaufman | B60K 6/442 | 477/5 |
| 2015/0260277 A1* | 9/2015 | Zaremba | F16H 59/50 | 701/51 |
| 2015/0321658 A1* | 11/2015 | Hansson | B60K 6/48 | 701/22 |
| 2015/0360675 A1* | 12/2015 | Nefcy | F16H 61/0031 | 701/22 |
| 2016/0082967 A1* | 3/2016 | Kam | B60W 30/18027 | 701/70 |
| 2016/0114780 A1* | 4/2016 | Gibson | B60W 10/02 | 477/53 |
| 2016/0138878 A1* | 5/2016 | Gopal | F01P 3/20 | 165/103 |
| 2016/0194007 A1* | 7/2016 | Furuya | B60W 10/02 | 477/174 |
| 2016/0264128 A1* | 9/2016 | Imamura | B60K 6/445 | |
| 2017/0001624 A1* | 1/2017 | Wang | B60W 10/06 | |
| 2017/0074130 A1* | 3/2017 | Leone | F01M 5/001 | |
| 2017/0074334 A1* | 3/2017 | Loktev | F16D 48/06 | |
| 2017/0122431 A1* | 5/2017 | Cho | F16H 59/56 | |
| 2017/0158190 A1* | 6/2017 | Cho | B60K 6/48 | |
| 2017/0166201 A1* | 6/2017 | Kim | B60K 6/48 | |
| 2017/0211685 A1* | 7/2017 | Hutchins | F16H 57/0415 | |
| 2017/0227113 A1* | 8/2017 | Malone | B60K 6/40 | |
| 2018/0087452 A1* | 3/2018 | Bidner | B60H 1/3208 | |
| 2018/0119597 A1* | 5/2018 | Styron | F01P 3/20 | |
| 2018/0163855 A1* | 6/2018 | Cho | F16H 61/0213 | |
| 2018/0237021 A1* | 8/2018 | Orita | B60W 10/08 | |

(56) References Cited

U.S. PATENT DOCUMENTS

2018/0312156 A1* 11/2018 Yoon ..................... B60K 6/48
2018/0347493 A1* 12/2018 Tascillo .............. F02D 41/1401

FOREIGN PATENT DOCUMENTS

| JP | 2011-207300 A | 10/2011 |
| JP | 2013-50130 A | 3/2013 |
| JP | 2013-79675 A | 5/2013 |
| KR | 10-1500403 B1 | 3/2015 |
| KR | 10-2015-0069398 A | 6/2015 |
| KR | 10-2016-0089696 A | 7/2016 |

* cited by examiner

FIG.8

| FAILURE MODE | WARNING MESSAGE | COOL DUAL CLUTCH TRANSMISSION |
|---|---|---|
| DUAL CLUTCH IS OPEN DUE TO OVERHEATING | DISPLAY STOP GUIDANCE MESSAGE | CONDITION FOR STARTING CONVECTION COOLING<br>1) DUAL CLUTCH IS OPEN DUE TO OVERHEATING<br>2) GEAR STAGE: P STAGE<br>3) GEAR STAGE: N STAGE<br>CONDITION FOR CANCELING CONVECTION COOLING<br>OVERHEATING STATE RELEASING |

HYBRID VEHICLE AND METHOD OF CONTROLLING THE SAME

CROSS-REFERENCE TO RELATED APPLICATION

This application claims the benefit of Korean Patent Application No. 10-2016-0129209, filed on Oct. 6, 2016 in the Korean Intellectual Property Office, the disclosure of which is incorporated herein by reference.

BACKGROUND

1. Field

The present disclosure relates to a hybrid vehicle and a method of controlling the same.

2. Description of the Related Art

A hybrid vehicle is a vehicle that uses two or more types of power sources and generally refers to a hybrid electric vehicle that is driven using an engine and a motor. A hybrid electric vehicle may use two or more types of power sources including an engine and a motor and may have various structures.

Generally, a transmission mounted electric system (TMED) type power train in which a motor, a transmission, and a driving shaft are serially connected is being used in a hybrid electric vehicle. Also, a clutch is disposed between an engine and the motor, and the hybrid electric vehicle is operate in an electric vehicle (EV) mode or a hybrid electric vehicle (HEV) mode according to whether the clutch is coupled.

Also, in a case of a typical transmission, a dual clutch transmission is often used. A dual clutch transmission may be viewed as an automated version of a manual transmission having two clutches. That is, a dual clutch transmission has the same inner structure as a manual transmission. A typical manual transmission has a dual axis structure including an input shaft configured to receive power from an engine and an output shaft configured to transmit power to a wheel.

Also, a dual clutch transmission has a characteristic in which a transmission operation can be promptly performed without torque transmission being interrupted when a gear shift stage is changed.

The disclosure of this section is to provide background of the invention. Applicant notes that this section may contain information available before this application. However, by providing this section, Applicant does not admit that any information contained in this section constitutes prior art.

SUMMARY

The present disclosure is directed to a hybrid vehicle that determines a state of charge (SOC) of a battery and controls rotation of a motor to cool a dual clutch transmission based on the determined SOC of the battery when the dual clutch is open due to overheating of the dual clutch transmission, and a method of controlling the same.

A dual clutch may be overheated due to an increase in a slip amount of the clutch and a lack of cooling time under a condition in which hill climbing is repeated and heavy-load starting is repeated. Phased advance warning for a state in which a dual clutch is overheated is displayed according to temperature to a driver. However, when a warning temperature is inevitably reached and the dual clutch is open, it may cause great inconvenience to the driver. Consequently, when a dual clutch is open, the dual clutch needs be efficiently and rapidly cooled.

A hybrid vehicle includes a motor for providing a driving force of the vehicle in addition to an engine. The vehicle further includes a dual clutch transmission configured to deliver power from a motor to a wheel of the vehicle. Overheating of the dual clutch transmission can occur during a hill hold or a creep driving of the vehicle due to a slip inside the transmission, particularity when the transmission of the vehicle does not have a torque converter that can delay or prevent overheating of the transmission during a hill hold or a creep driving.

An aspect of the present invention discloses a method and system for cool down of an overheated dual clutch transmission (DCT) 200 in the hybrid vehicle using an air flow generated from rotation of the motor 500 when the motor is released from the DCT.

A computerized controller determines whether the DCT 200 is overheated using signals from at least one temperature sensor connected to the DCT. When it is determined that the DCT is overheated (temperature is higher than a first reference temperature), the controller causes a display or a speaker to provide the driver to stop or park the vehicle. Subsequently, when the vehicle is stopped or parked the controller causes the dual clutch transmission 200 to release the motor 500 such that rotation of the motor is not transferred to the transmission and does not cause additional slip or heating inside the transmission.

Subsequently to a stopping or a parking of the vehicle, when SOC of the battery 600 is higher than a first reference, the controller causes the motor 500 to rotate while it is released from the transmission to provide or increase air flow around or toward the DCT 200 for cooling. In embodiments, the motor is connected to a fan to generate an air flow around a housing of the DCT.

Subsequently, when SOC of the battery 600 falls below a second reference lower than the first reference while the DCT is still overheated, the controller causes an engine clutch 450 of the vehicle to connect the engine 400 and the motor such that the motor rotates (and a fan connected to the motor) using power from the engine to provide air flow around the DCT for cooling not using power from the battery connected to the battery. In embodiments, when the engine clutch 450 connects the engine and the motor, the controller causes the battery 600 to be charged from operation of the engine 400 via a generator 700.

In embodiment, when the temperature of the transmission is lowered to a predetermined ranged of normal operation or to a second reference temperature different from the first reference temperature for determining overheating of the transmission, the transmission is automatically connected back to the motor or the engine, without a separate command of the driver. In embodiments, to prevent a sudden movement of the vehicle due to the automatic the controller set a neural or parking gear of the vehicle, subsequent to release of the motor from the transmission due to overheating.

Here, the present disclosure is directed to a hybrid vehicle capable of controlling rotation of a motor using power of an engine to cool a dual clutch transmission by connecting the engine to the motor according to an SOC of a battery and charging the battery while the dual clutch transmission is being cooled, and a method of controlling the same.

To achieve the above aspects, a hybrid vehicle and a method of controlling the same are provided.

According to an aspect, a hybrid vehicle includes a battery configured to store electrical energy, a motor configured to rotate using the electrical energy, a transmission including a first clutch and a second clutch that are connectable to the motor, and a controller configured to control rotation of the motor to cool the transmission when the transmission is determined to be in an overheated state.

The overheated state of the transmission may include a state in which the first clutch and the second clutch are open.

The controller may determine a state of charge (SOC) of the battery and control rotation of the motor to cool the transmission based on a determined result of an SOC of the battery.

The hybrid vehicle may further include an engine configured to generate power and an engine clutch disposed between the engine and the motor and configured to connect or disconnect the engine and the motor.

The SOC of the battery may be classified as a first reference value and a second reference value, and the first reference value and the second reference value may include differing values that represent the SOC of the battery with a numerical value.

When the SOC of the battery is determined to be the first reference value or higher, the controller may control rotation of the motor to cool the transmission.

The hybrid vehicle may further include a hybrid starter generator (HSG) configured to generate the electrical energy by using power of the engine and charge the battery.

When the SOC of the battery is determined to be lower than the first reference value, the controller may lock up the engine clutch, connect the engine to the motor, and control rotation of the motor by using power of the engine to cool the transmission.

When the SOC of the battery is determined to be lower than the second reference value, the controller may lock up the engine clutch, connect the engine to the motor, control rotation of the motor by using power of the engine to cool the transmission, and charge the battery by using the HSG.

When the first clutch and the second clutch are open, the controller may control a gear stage of the transmission to be neutral.

The transmission may further include a transmission overheat sensor configured to determine an overheated state of an inside of the transmission.

The hybrid vehicle may further include a display configured to display information on an overheated state of the transmission when the transmission is overheated.

According to another aspect, a method of controlling a hybrid vehicle includes determining an overheated state of a transmission and controlling rotation of a motor to cool the transmission when the transmission is determined to be in an overheated state.

The controlling rotation of the motor to cool the transmission when the transmission is determined to be in the overheated state may include determining an SOC of a battery and controlling rotation of the motor to cool the transmission based on a determined result of an SOC of the battery.

The transmission may include a first clutch and a second clutch that are connectable to the motor.

The determining of the overheated state of the transmission may include determining whether the first clutch and the second clutch are open.

The method of controlling a hybrid vehicle may further include controlling a gear stage of the transmission to be neutral when the first clutch and the second clutch are open.

The controlling rotation of the motor to cool the transmission based on a determined result of an SOC of the battery may include controlling rotation of the motor to cool the transmission when the SOC of the battery is determined to be a first reference value or higher.

The controlling rotation of the motor to cool the transmission based on a determined result of an SOC of the battery may include connecting an engine to the motor to use power of the engine when the SOC of the battery is determined to be lower than the first reference value and controlling rotation of the motor by using the power of the engine to cool the transmission.

The controlling rotation of the motor to cool the transmission based on a determined result of an SOC of the battery may include connecting the engine to the motor to use the power of the engine when the SOC of the battery is determined to be lower than a second reference value, controlling rotation of the motor by using the power of the engine to cool the transmission, and generating electrical energy by power of the engine and charging the battery by the electrical energy.

BRIEF DESCRIPTION OF THE DRAWINGS

These and/or other aspects of the disclosure will become apparent and more readily appreciated from the following description of embodiments, taken in conjunction with the accompanying drawings of which:

FIG. 8 is a view for describing a condition in which a transmission cooling process may start according to an embodiment.

DETAILED DESCRIPTION

Figure 1:
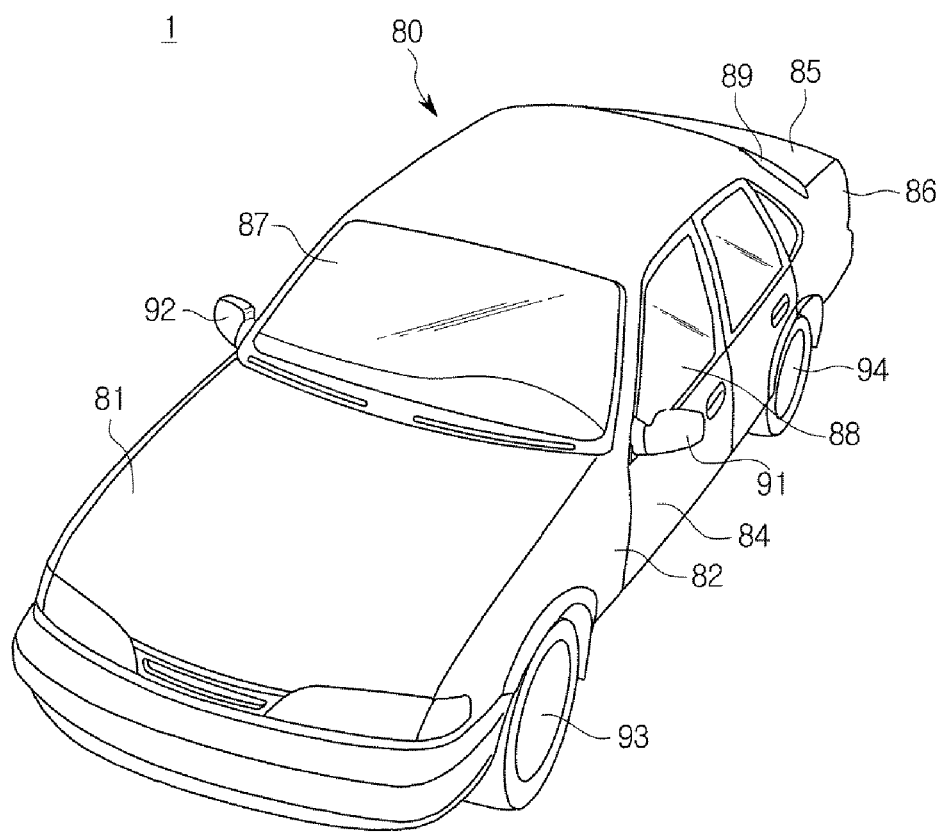
FIG. 1 is a view illustrating an exterior of a hybrid vehicle according to an embodiment.

Objectives, specific advantages, and novel features of the present disclosure will become more apparent from detailed description and exemplary embodiments below which are related to the accompanying drawings. In the present specification, in giving a reference numeral to elements of each of the drawings, it should be noted that like reference numerals are given to like elements throughout the drawings. Also, in describing the present disclosure, when detailed description of a known related art is deemed to unnecessarily blur the gist of the present disclosure, the detailed description thereof will be omitted. In the present specification, terms such as first and second are used to differentiate one element from another element, and an element is not limited by the terms.

Hereinafter, a hybrid vehicle and a method of controlling the same according to an embodiment will be described with reference to FIGS. 1 to 9. For a hybrid vehicle 1 according to an embodiment that will be described below, a hybrid vehicle having a transmission mounted electric system (TMED) type structure will be described as an example. However, the scope of the present disclosure is not limited thereto, and the present disclosure may also be applied to other types of hybrid electric vehicles.

FIG. 1 is a view illustrating an exterior of a hybrid vehicle according to an embodiment.

Referring to FIG. 1, the hybrid vehicle 1 includes a vehicle body 80 configured to form an exterior of the hybrid vehicle 1 and vehicle wheels 93 and 94 configured to move the hybrid vehicle 1. The vehicle body 80 includes a hood 81, a front fender 82, a door 84, a trunk lid 85, and a quarter panel 86.

Also, a front window 87 installed at the front of the vehicle body 80 to provide a view in front of the hybrid vehicle 1, a side window 88 configured to provide a side view, side mirrors 91 and 92 installed at the door 84 to provide views behind and beside the hybrid vehicle 1, and a rear window 90 installed at the rear of the vehicle body 80 to provide a view behind the hybrid vehicle 1.

In FIG. 1 (illustrated in FIG. 4), the hybrid vehicle 1 may include a transmission 200 configured to transmit power by changing power to a rotational force required according to velocity, a controller 300 configured to control an element of the hybrid vehicle 1, an engine 400 configured to burn fuel to generate power, a motor 500 configured to provide power and be operated by a generator during braking to generate electrical energy, a battery 600 configured to charge electrical energy, and a hybrid starter generator (HSG) 700 configured to start the hybrid vehicle 1 or be operated by a generator using power of the engine to generate electrical energy.

Using the elements above, the hybrid vehicle 1 may rapidly and efficiently cool the transmission 200 when a dual clutch inside the transmission 200 is open due to overheating of the transmission 200, thereby rapidly and efficiently releasing the open state of the dual clutch inside the transmission 200. This will be described in detail below with reference to FIG. 4.

Figure 2:
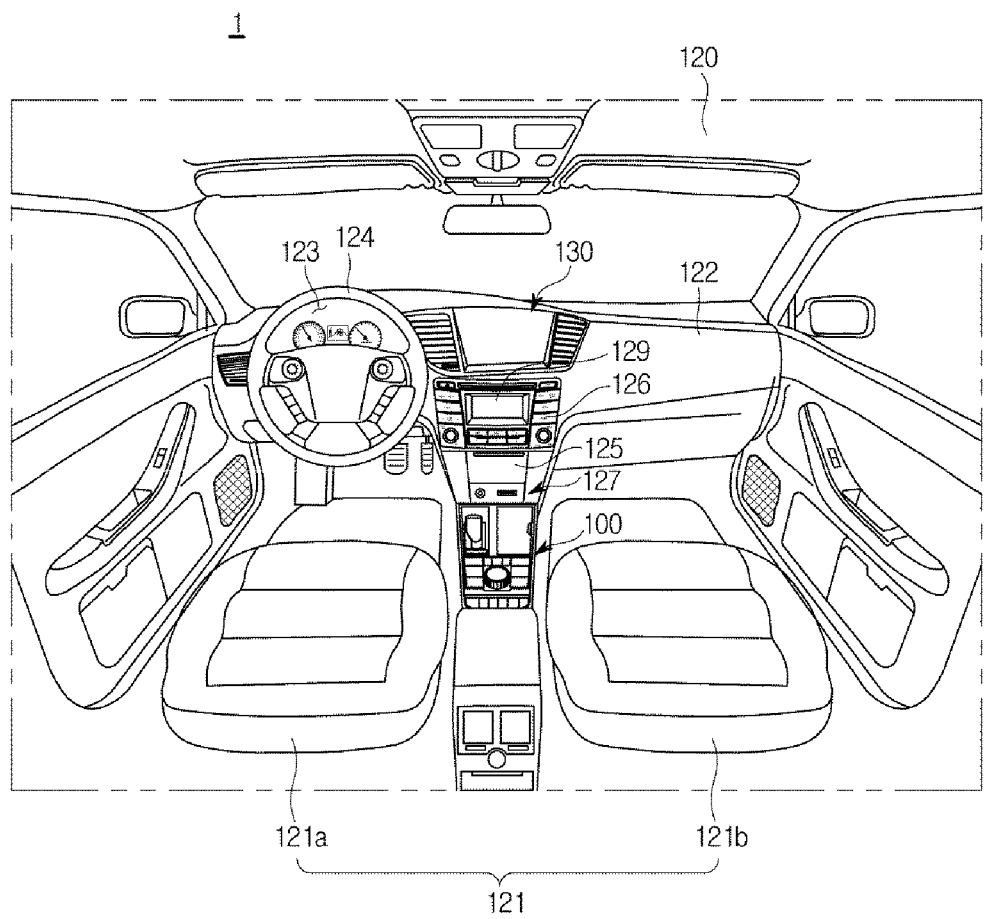
FIG. 2 is a view illustrating an interior of the hybrid vehicle according to an embodiment.

FIG. 2 is a view illustrating an interior of the hybrid vehicle according to an embodiment.

Referring to FIG. 2, an interior 120 of the vehicle body may include seats 121 (121a and 121b) configured to have a passenger seated thereon, a dashboard 122, an instrument panel (i.e., a cluster 123) arranged on the dashboard and configured to have a tachometer, a speedometer, a coolant thermometer, a fuel gauge, a turn signal indicator, high beam indicator light, warning light, seat belt warning light, an odometer, automatic transmission selection lever indicator light, door open warning light, engine oil warning light, and low fuel warning light arranged thereon, a steering wheel 124 configured to control a traveling direction of the hybrid vehicle 1, and a center fascia 125 having an adjustment plate of an audio system and an air conditioner.

The seats 121 may include a driver seat 121a configured to have a driver seated thereon, a front passenger seat 121b configured to have a fellow passenger seated thereon, and a back seat disposed at the rear inside the vehicle.

The cluster 123 may be digitally implemented. The digital cluster may display vehicle information and driving information by an image.

The center fascia 125 may include a head unit 126 disposed at the dashboard 122 between the driver seat 121a and the front passenger seat 121b and configured to control the audio system, the air conditioner, and a hot wire of the seats.

Here, the heat unit 126 may include a plurality of button units configured to receive an operation command for the audio system, the air conditioner, and the hot wire of the seats.

An air outlet, a cigar jack, a multi-terminal 127, etc. may be installed at the center fascia 125.

Here, the multi-terminal 127 may be arranged adjacent to the head unit 126, may include a universal serial bus (USB) port, an auxiliary (AUX) port and further include a secure digital (SD) slot. Software update information for each system may be received from an external storage system through the multi-terminal 127 to update each of the systems.

The hybrid vehicle 1 may further include an input unit 100 configured to receive operation commands for various types of functions from a user and a display 800 configured to display information on a function that is currently being performed, information input by the user, image information, and sound information.

The input unit 100 may be provided at the heat unit 126 and the center fascia 125 and may include one or more physical buttons such as operations on/off buttons for various types of functions and buttons for changing set values for various types of functions.

The input unit 100 may transmit a button manipulation signal to an electronic control unit (ECU), the controller in the heat unit 126, an audio/video/navigation (AVN) system 130, and other systems.

The input unit 100 may include a touch panel integrally provided with the display 800 of the AVN system 130. The input unit 100 may be activated and displayed in shapes of buttons on the touch panel of the AVN system 130. Here, the input unit 100 receives position information on the displayed buttons.

The input unit 100 may further include a jog dial or a touch pad configured to receive a movement command, a selection command, etc. for a cursor displayed on the touch panel of the AVN system 130. Here, the jog dial or the touch pad may be provided at the center fascia and the like.

More specifically, the input unit 100 may receive any one of a manual driving mode in which a driver directly drives a vehicle and an autonomous driving mode and may transmit an input signal of the autonomous driving mode to the ECU when the autonomous driving mode is input.

Also, the input unit 100 may receive information on a destination and transmit the received information on a destination to the AVN system 130 when a navigation function is selected and may receive information on a channel and a volume and transmit the received information on a channel and a volume to the AVN system 130 when a digital multimedia broadcasting (DMB) function is selected.

The AVN system 130 configured to receive information from a user and output a result corresponding to the received information may be provided at the center fascia 125.

The AVN system 130 may perform one or more functions among the navigation function, the DMB function, an audio function, and a video function and may display road environment information and driving information during the autonomous driving mode.

Also, the AVN system 130 may include a display panel and may display currently updated information to a user through the display panel. The display panel may employ a light emitting diode (LED) panel, an organic LED (OLED) panel, a liquid crystal display, or the like.

The AVN system 130 may be installed by being mounted on the dashboard.

A chassis of the hybrid vehicle 1 further includes a power generation system, a power train, a driving system, a steering system, a brake system, a suspension system, a transmission system, a fuel system, and front and rear left and right vehicle wheels, etc. Also, the vehicle further includes various types of safety systems for safety of a driver and a passenger.

Safety systems in the hybrid vehicle may include various types of safety systems such as an airbag control system configured to ensure safety of a passenger such as a driver when a vehicle collision occurs and a vehicle orientation electronic stability control (ESC) system configured to control a vehicle orientation when the vehicle accelerates or corners.

Other than above, the hybrid vehicle 1 may further include a sensor such as a proximity sensor configured to sense an obstacle or another vehicle at the rear or at the side, a rain sensor configured to sense rainfall and a rainfall amount, a wheel velocity sensor configured to detect a velocity of wheels of the vehicle, a lateral acceleration sensor configured to detect a lateral acceleration of the vehicle, a yaw rate sensor configure to detect a change in angular velocity of the vehicle, a gyro sensor, and a steering angle sensor configured to detect rotation of the steering wheel of the vehicle The hybrid vehicle 1 includes an electronic control unit (ECU) configured to control operations of the power generation system, the power train, the driving system, the steering system, the brake system, the suspension system, the transmission system, the fuel system, the various types of safety systems, and various types of sensors. The ECU will be described in detail below with reference to FIG. 3.

Also, the vehicle 1 may selectively include an electronic system such as a hands-free system installed for a driver's convenience, a global positioning system (GPS), an audio system, a Bluetooth system, a rear camera, a terminal system charger, a high-pass system, etc.

The hybrid vehicle 1 may further include a start-up button configured to input an operation command to a start-up motor.

That is, the hybrid vehicle 1 operates the start-up motor and operates the engine 400 (see FIG. 4), which is a power generation system, by the operation of the start-up motor when the start-up button is turned on.

The hybrid vehicle 1 includes the battery 600 electrically connected to a terminal system, the audio system, interior light, the start-up motor, and other electronic control systems to supply actuating power. The battery is charged using one or more of a self-generator, power of the engine, and power of the motor.

Figure 3:
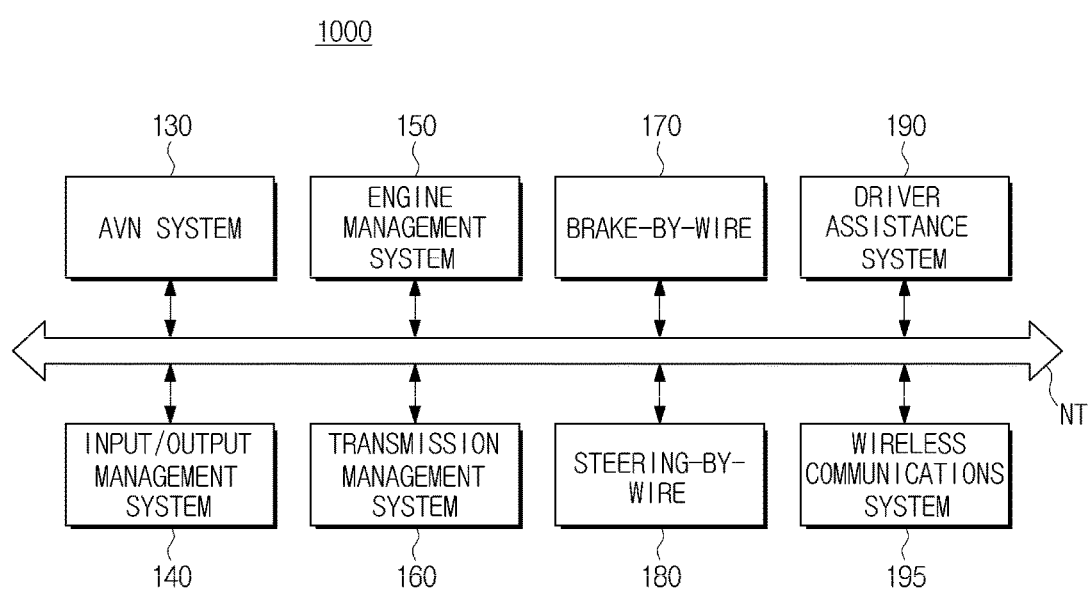
FIG. 3 is a view illustrating electronic control systems included in the hybrid vehicle according to an embodiment.

FIG. 3 is a view illustrating electronic control systems included in the hybrid vehicle according to an embodiment.

The hybrid vehicle 1 may include a power system configured to generate power so that the hybrid vehicle 1 can travel, a power train configured to shift and transmit power generated by the power system to vehicle wheels, a steering system configured to control a traveling direction of the hybrid vehicle 1, a brake system configured to stop rotation of the vehicle wheels, a suspension system configured to attenuate vibration of the hybrid vehicle 1, and electronic control systems 1000 configured to electrically control each of the configurations included in the hybrid vehicle 1.

The power system may include the engine 400 (see FIG. 4), the motor 500 (see FIG. 4), the fuel system, a cooling system, an air exhaust system, an ignition system, etc., and the power train may include an engine clutch 450 (see FIG. 4), the transmission 200 (see FIG. 4), a differential gear, a driving shaft, etc.

The steering system may include a steering wheel, a steering gear, a steering link, etc., the brake system may include a brake disk, a brake pad, a master cylinder, etc., and the suspension system may include a shock absorber, etc.

The hybrid vehicle 1 may include various electronic control systems 2000 together with the mechanical systems described above.

Specifically, the hybrid vehicle 1 may include the AVN system 130, an input/output management system 140, an engine management system (EMS) 150, a transmission management system (TMS) 160, a brake-by-wire 170, a steering-by-wire 180, a driver assistance system (DAS) 190, and a wireless communications system 195. The electronic control systems 1000 illustrated in FIG. 3 is merely some of the electronic systems included in the hybrid vehicle 1, and other various electronic systems may be provided in the hybrid vehicle 1. Also, the hybrid vehicle 1 does not necessarily include all of the electronic control systems 1000 illustrated in FIG. 3. Some of the electronic systems may be omitted as needed.

The various types of electronic control systems 1000 included in the hybrid vehicle 1 may communicate with each other through a vehicular communication network (NT). The vehicular communication NT may employ a communications protocol such as Media Oriented Systems Transport (MOST) having a maximum communications speed of 24.5 mega-bits per second (Mbps), FlexRay having maximum communications speed of 10 Mbps, a controller area network (CAN) having a communications speed in a range of 125 kilo-bits per second (kbps) to 1 Mbps, and a local interconnect network (LIN) having a communications speed of 20 kbps. The vehicular communication NT may employ a single communications protocol as well as a plurality of communications protocol from MOST, FlexRay, CAN, and LIN.

The AVN system 130 is a system configured to output music or an image according to a control command from a driver. Specifically, the AVN system 130 may play music or a video according to a control command from the driver or guide a route to a destination.

The input/output management system 140 receives a control command from the driver through buttons and displays information corresponding to the control command from the driver. The input/output management system 140 may include a cluster display provided at the dashboard to display a vehicle speed, an engine rotation speed, an amount of lubrication, information on an overheated state of the transmission, etc. and a wheel button module installed at the steering wheel.

The engine control system 150 performs fuel injection control, fuel efficiency feedback control, lean-burn control, ignition timing control, and idle revolutions per minute control. The engine control system 150 may be a single system as well as a plurality of systems connected through communications.

The TMS 160 performs shifting point control, damper clutch control, pressure control when a friction clutch is turned on or off, and engine torque control while shifting. The TMS 160 may be a single system as well as a plurality of systems connected through communications.

The brake-by-wire 170 may control braking of the hybrid vehicle 1 and may typically include an anti-lock brake system (ABS) and the like.

The steering-by-wire 180 decreases a steering force when driving at a slow speed of parking and increases the steering force when driving at a high speed to assist steering manipulation of the driver.

The DAS 190 assists driving of the hybrid vehicle 1 and may perform a front collision avoidance function, a lane departure warning function, a blind spot detection function, a rear-end detection function, etc.

The DAS 190 may include a plurality of devices connected through communications. For example, the DAS 190 may include a forward collision warning system (FCW), an advanced emergency braking system (AEBS), an adaptive cruise control (ACC) system, a lane departure warning system (LDWS), a lane keeping assist system (LKAS), a blind spot detection (BSD) system, a rear-end collision warning system (RCW), etc.

The wireless communications system 195 may communicate with an external vehicle, an external terminal, a communications relay, or the like.

The wireless communications system 195 may transmit and receive signals through various communications protocols. For example, the wireless communications system 195 may employ a second-generation (2G) communications method such as time division multiple access (TDMA) and code division multiple access (CDMA), a third-generation (3G) communications method such as a wide code division multiple access (WCDMA), CDMA2000, wireless broadband (Wibro), and world interoperability for microwave access (WiMAX), and a fourth-generation (4G) communications method such as long term evolution (LTE) and wireless broadband evolution. Moreover, the wireless communications system 195 may employ a fifth-generation (5G) communications method.

Figure 4:
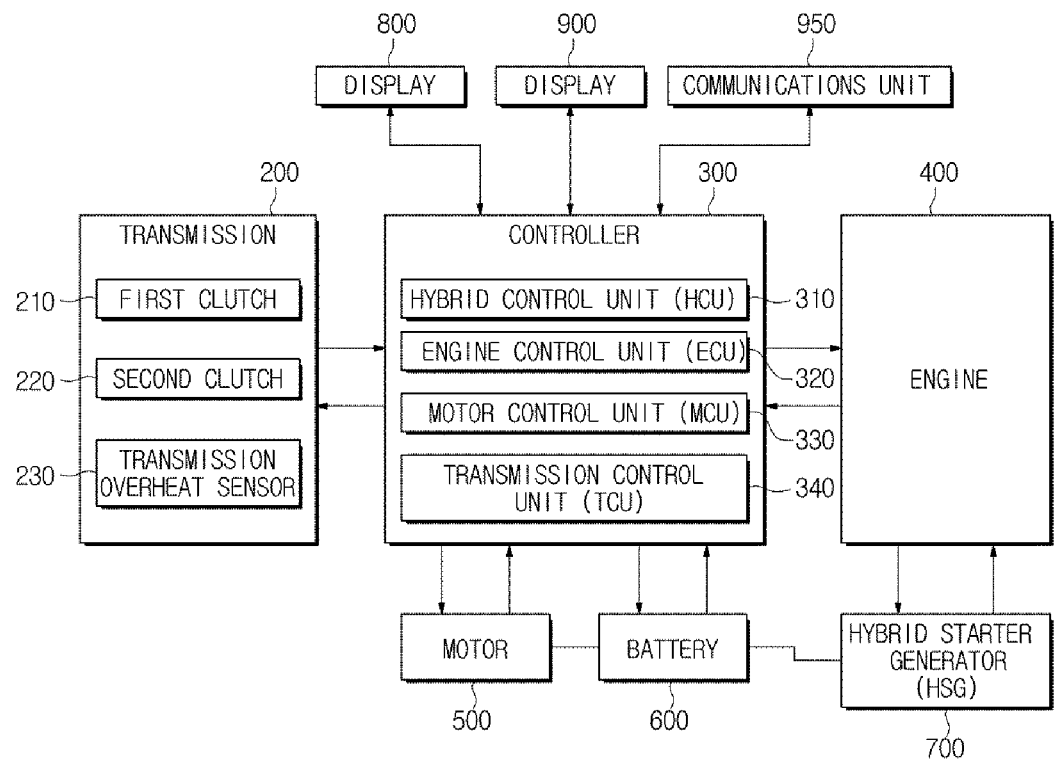
FIG. 4 is a view illustrating a block diagram of the hybrid vehicle according to an embodiment.
Figure 5:
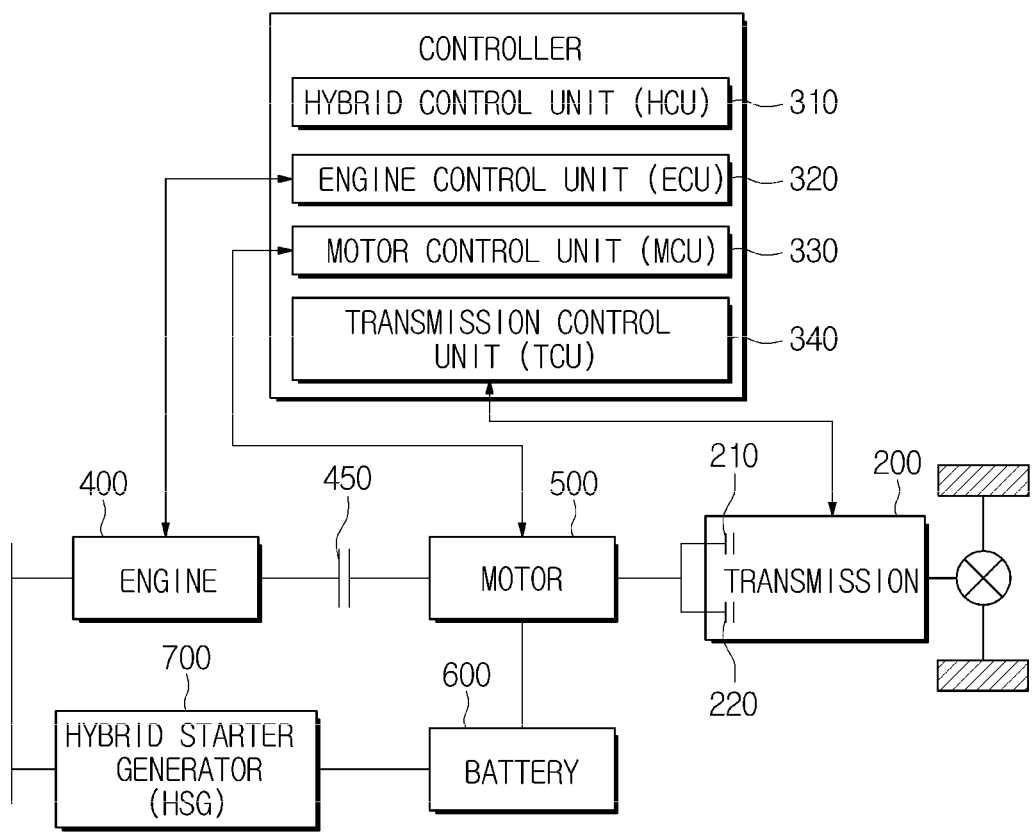
FIG. 5 is a view for describing an operating process and control of the hybrid vehicle according to an embodiment.

FIG. 4 is a view illustrating a block diagram of the hybrid vehicle according to an embodiment. Also, FIG. 5 is a view for describing an operating process and control of the hybrid vehicle according to an embodiment.

Hereinafter, when a dual clutch is open due to overheating of the transmission 200 (see FIG. 4) of the hybrid vehicle 1, a process in which the hybrid vehicle 1 uses rotation of the motor 500 to cool the transmission 200 to release the open state will be described in detail with reference to FIGS. 4 and 5.

The hybrid vehicle 1 includes the transmission 200 configured to transmit power by changing power to a rotational force required according to velocity, the controller 300 configured to control each element of the hybrid vehicle 1, the engine 400 configured to burn fuel to generate power, the motor 500 configured to rotate using electrical energy, the battery 600 configured to store electrical energy, and a HSG 700 configured to be operated by starting the hybrid vehicle 1 or by a generator using power of the engine to generate electrical energy.

Also, the hybrid vehicle 1 may further include the engine clutch 450 disposed between the engine 400 and the motor 500 and configured to connect or disconnect the engine 400 to the motor 500.

Also, the hybrid vehicle 1 may further include the display 800 configured to output one or more of information on an overheated state of the transmission 200 and information on a state of a dual clutch of the transmission 200 in a graphic interface form, a storage 900 configured to store settings information on the hybrid vehicle 1, and a communications unit 950 configured to enable communications between each of the elements.

However, the hybrid vehicle 1 is not limited to having the elements described above, may include more elements, and is not limited thereto.

The transmission 200 may change power generated from the motor 500 to a rotational force required according to a velocity and transmit the rotational force to the vehicle wheels.

Also, the transmission 200 may include a first clutch 210 and a second clutch 220 configured to be connectable to the motor 500 and receive power from the motor 500. Also, the transmission 200 may further include a transmission overheat sensor 230 configured to determine an overheated state of an inside of the transmission 200 by using a temperature sensor, heat sensor, etc. Also, the transmission 200 may use a known dry type or wet type clutch.

The first clutch 210 and the second clutch 220 are devices connected to or disconnected from the motor 500 and may transmit power from the motor 500 to an axle.

Specifically, the first clutch 210 may be configured to transmit or shut off output torque transmitted from the motor 500 at even number stages (e.g., a second-stage, a fourth-stage, a sixth-stage, and R stage), and the second clutch 220 may be configured to transmit or shut off the output torque transmitted from the motor 500 at odd number stages (e.g., a first-stage, a third-stage, a fifth-stage). The output torque from the motor 500 is transmitted to the power system when one or more of the first clutch 210 and the second clutch 220 are engaged, and an output of the engine may be shut off when the engagement is released.

Also, hereinafter, a connection state of each of the first clutch 210 and the second clutch 220 will be described by being classified into an open state, an engaged state, and a lock-up state. Even when a clutch is engaged, the clutch may be engaged while a certain amount of slip is allowed for efficiency of shifting. The clutch may be locked up according to a predetermined driving state including a case in which a vehicle exceeds a predetermined velocity. In addition to the above descriptions, a specific shifting method of the transmission using the first clutch 210 and the second clutch 220 at each gear shift stage and an effect thereof will be described.

The transmission 200 applied to the hybrid vehicle 1 according to an embodiment refers to a dual clutch transmission (hereinafter, a DCT), description will be given on the basis of a DCT. However, this is merely an embodiment, and the present disclosure is not limited thereto.

The transmission 200 includes the first clutch 210 and the second clutch 220, and the first clutch 210 and the second clutch 220 are connected to odd number stages and even number stages, respectively, through a clutch actuator to transmit or shut off power from the motor 500.

In a case of a 6-stage gear shift, the first clutch 210 is configured to be engaged with a first-stage gear, a third-stage gear, and a fifth-stage gear, and the second clutch 220 is configured to be engaged to a second-stage gear, a fourth-stage gear, a sixth-stage gear, and an R-stage gear. When the first clutch 210 is engaged and the hybrid vehicle 1 is being driven at a specific gear shift stage (e.g., a first-stage), the second clutch 220 may wait while being engaged with a gear shift stage (a second-stage) before an upshift or a downshift occurs, and the hybrid vehicle 1 may be driven at a subsequent gear shift stage (the second-stage) using the second clutch 220 when a shift occurs.

When a dual clutch of the transmission 200 is used, i.e., when the first clutch 210 and the second clutch 220 are used, an amount of time in which an output torque from the engine is cut off may be decreased and fuel efficiency may be increased at the same time due to using two clutches, compared to a typical automatic transmission system.

Meanwhile, a dry type clutch configured to transmit power of the motor 500 by friction is mostly used in the transmission 200. In a case of a dry type clutch, a temperature may sharply increase due to heat caused by friction. When temperatures of the first clutch 210 and the second clutch 220 are excessively increased, the first clutch 210 and the second clutch 220 may be damaged.

Consequently, when the inside of the transmission 200 is overheated, a connected state between the first clutch 210 and the second clutch 220 to the motor 500 (connection between the motor and the DCT) needs to be released to prevent damages of the first clutch 210 and the second clutch 220. Also, a state in which connection between the first clutch 210 and the second clutch 220 to the motor 500 is released may also be referred to as "a state in which the first clutch 210 and the second clutch 220 are open." Consequently, hereinafter, an overheated state of the transmission 200 is assumed as a state in which the first clutch 210 and the second clutch 220 are open.

The transmission overheat sensor 230 may use a temperature sensor, a heat sensor, etc. to sense temperatures of the first clutch 210 and the second clutch 220. Also, the transmission overheat sensor 230 may sense temperature of the first clutch 210 and the second clutch 220 and, when the temperature exceeds a predetermined critical temperature, i.e., when of the first clutch 210 and the second clutch 220 are determined to be in an overheated state, the transmission overheat sensor 230 may transmit information on the overheated state in the form of an electrical signal to the controller 300.

The controller 300 that has received the signal may control the transmission 200 to release connection between the first clutch 210 and the second clutch 220 to the motor 500.

This is to prevent damages of the first clutch 210 and the second clutch 220. However, when both of the first clutch 210 and the second clutch 220 are open, power of the motor 500 is shut off, and a driver cannot control the vehicle as intended. Consequently, a more dangerous situation may occur to the driver according to a vehicle driving situation (e.g., being driven at a high speed). Thus, it is assumed that the first clutch 210 and the second clutch 220 are open when the vehicle is stopped.

The controller 300 may collectively control elements of the hybrid vehicle 1. Also, the controller 300 may include a hybrid control unit (HCU) 310, an engine control unit (ECU) 320, a motor control unit (MCU) 330, and a transmission control unit (TCU) 340.

The HCU 310 is a top-level controller configured to control operations of other controllers, settings of a hybrid driving mode, and overall operations of the hybrid vehicle. The HCU 310 connects each of the controls through a high-speed CAN communications line so that the controllers may transmit and receive information to and from each other and executes cooperative control to control output torque of the engine 400 and the motor 500.

The ECU 320 controls overall operation of the engine 400 according to engine state information such as a demanded torque signal from the driver, coolant temperature, and an engine torque.

The MCU 330 controls overall operation of the motor 500 according to a demanded torque signal from the driver, an operation mode of the hybrid vehicle, and an SOC of the battery 600.

The TCU 340 controls overall operation of the transmission 200 by controlling a shift ratio according to an output torque from each of the ECU 320 and the MCU 330, determining a regenerative braking amount, etc.

The hybrid system including those mentioned above is well-known to those of ordinary skill in the art. Thus, a detailed description of each configuration thereof will be omitted.

Also, it has been described above that the controller 300 includes all of the HCU 310, the ECU 320, the MCU 330, and the TCU 340. Although the configuration of the controller 300 is divided into a plurality of configurations as above to facilitate description of each control, the HCU 310, the ECU 320, the MCU 330, and the TCU 340 may also be included in a single processor.

Consequently, a control command from any one of the HCU 310, the ECU 320, the MCU 330, and the TCU 340 may be described as a command from the controller 300. Thus, unless particularly mentioned otherwise, the HCU 310, the ECU 320, the MCU 330, and the TCU 340 will all be referred to as the controller 300 for convenience of description in a process of the hybrid vehicle 1 according to an embodiment that will be described below.

When the transmission 200 is determined to be in an overheated state, because the overheated state signifies that the first clutch 210 and the second clutch 220 of the transmission 200 are open, the controller may determine an SOC of the battery 600 to cool the transmission 200 and control rotation of the motor 500 to cool the transmission 500 based on a determined result of an SOC of the battery 600. That is, the transmission 200 may be rapidly cooled by an air flow generated by convection of air around the motor 500 by rotation of the motor 500. This is referred to as convection cooling. Also, the transmission 200 may be more rapidly or more slowly cooled according to a rotational speed of the motor 500.

When the transmission 200 is determined to be in an overheated state, i.e., when the first clutch 210 and the second clutch 220 are open, the controller 300 may control a gear stage of the transmission 200 to be neutral. This is to prevent a sudden unintended acceleration of the vehicle that may occur when the first clutch 210 and the second clutch 220 of the transmission 200 are locked up to the motor 500 when the transmission 200 is cooled, i.e., has finally reached a normal state, by being controlled by the controller 300.

Specifically, when a temperature inside the transmission 200 exceeds above a predetermined critical temperature, the controller 300 may receive information thereon in the form of an electrical signal through the transmission overheat sensor 230.

In this way, the controller 300 may determine whether the transmission 200 is in an overheated state. Although it has been described above, since an overheated state of the transmission 200 signifies that connection between the first clutch 210 and the second clutch 220 to the motor 500 are released, i.e. the first clutch 210 and the second clutch 220 are open, the controller 300 has to cool the transmission 200 to make connection states of the first clutch 210 and the second clutch 220 normal.

When the transmission 200 is determined to be in an overheated state through the process above, the controller 300 may determine an SOC of the battery 600.

An SOC of the battery 600 may be classified as a first reference value and a second reference value. The first reference value and the second reference value are differing values that represent the SOC of the battery with a numerical value. This will be described in detail below with reference to FIG. 7.

When the SOC of the battery 600 is determined to be the first reference value or higher as a result of receiving battery information from the battery 600, the controller 300 may control rotation of the motor 500 to cool the transmission 200. Here, the controller 300 may control a rotational speed of the motor 500 in consideration of an overheated state to more rapidly cool the transmission 200. Here, the first reference value may be preset. For example, 80% may be set as the first reference value of the SOC of the battery 600. Consequently, the above process is performed when the SOC of the battery 600 is 80% or higher.

Also, when the SOC of the battery 600 is determined to be less than the first reference value as a result of receiving battery information from the battery 600, the controller 300 may lock up the engine clutch 450 that enables the engine 400 and the motor 400 to be connected to each other to connect the engine 400 to the motor 500 and control rotation of the motor 500 by power of the engine 400 to cool the transmission 200.

A reason for locking up the engine clutch 450 to connect the engine 400 and the motor 500 to each other is to use power of the engine 400 in cooling the transmission 200 because the transmission 200 is considered as being difficult to be cooled only by the motor 500 in consideration of the SOC of the battery 600.

Here, the controller 300 may cool the transmission 200 with minimum consumption of the battery 600 by controlling rotation of the motor 500 with power of the engine 400 in consideration of an overheated state. Here, the first reference value may be preset. For example, 80% may be preset as the first reference value of the SOC of the battery 600. Consequently, the above process is performed when the SOC of the battery 600 is less than 80%.

When the SOC of the battery 600 is determined to be less than a second reference value as a result of receiving battery information from the battery 600, the controller 300 may lock up the engine clutch 450 to connect the engine 400 to the motor 500, control rotation of the motor 500 by power of the engine 400 to cool the transmission 200, and charge the battery 600 by the HSG 700. This is to enable the battery 600 to be charged simultaneously while the transmission 200 is being cooled.

Here, the second reference value may be preset. For example, 20% may be preset as the second reference value of the SOC of the battery 600. Consequently, when the SOC of the battery 600 is less than 20%, since it signifies that the battery 600 is not sufficiently charged for controlling rotation of the motor 500, the transmission 200 is cooled and the battery 600 is charged at the same time. A specific method of charging the battery 600 will be described below with description of the HSG 700.

The engine 400 may burn fuel to generate power and transmit the power to the motor 500 through the engine clutch 450.

The engine clutch 450 may receive a control command from the controller 300 and connect or disconnect the engine 400 and the motor 500. This is to transmit power of the engine 400 to the motor 500.

The motor 500 may receive electrical energy from the battery 600 to generate power and transmit the generated power to at least one of the first clutch 210 and the second clutch 220 of the transmission 200. Also, the motor 500 may be operated by a generator to generate electrical energy when the hybrid vehicle 1 is braked using a regenerative brake. Also, the motor 500 transmit the electrical energy generated as above to the battery 600.

The battery 600 may store electrical energy generated by the HSG 700 or store electrical energy generated by the motor 500 connected to the driving shaft when braking. Also, the battery 600 may transmit the stored electrical energy to the motor 500.

The HSG 700 may be operated by a starter according to a signal applied thereto from the controller 300 to start the engine 400 of the hybrid vehicle 1 or be operated by a generator while the engine 400 is operating, i.e., by using power of the engine 400, to generate electrical energy. In this way, the HSG 700 may charge the battery 600.

The display 800 may display one or more of information on an overheated state showing an overheated state of the transmission 200 and information on a connection state of the first clutch 210 and the second clutch 220 with a graphic interface.

The display 800 may include a liquid crystal display (LCD), a thin film transistor LCD (TFT CLD), an OLED, a flexible display, a three-dimensional (3D) display, and the like.

The storage 900 may store settings information on the hybrid vehicle 1 and store information on a control command from the controller 300. Also, the storage 900 may store information on an SOC of the battery 600. For example, the storage 900 may store information on set values of the first reference value and the second reference value for determining an SOC of the battery 600.

The storage 900 may include one or more types of storage media among a flash memory type, a hard disk type, a multimedia card micro type, a card type memory (e.g., a secure digital (SD) or extreme digital (XD) memory), a random access memory (RAM), a read-only memory (ROM), an electrically erasable programmable read-only memory (EEPROM), a programmable read-only memory (PROM), a magnetic memory, a magnetic disk, and an optical disk.

The communications unit 950 may include one or more elements that enable communications between an external device and each of the elements of the hybrid vehicle 1. For example, the communications unit 950 may include one or more of a short-range communications module, a wired communications module, and a wireless communications module. Consequently, each of the elements of the hybrid vehicle 1 described above may transmit and receive a signal to and from each other through the communications unit 950.

The short-range communications module may include various short-range communications module, such as a Bluetooth module, an infrared communications module, a radio frequency identification (RFID) communications module, a wireless local access network (WLAN) communications module, a near field communications (NFC) module, and a Zigbee communications module, configured to transmit and receive a signal using a wireless network at a short distance.

The wired communications module may include various types of wired communications modules such as a CAN module, a LAN module, a WAN module, and a value added network (VAN) as well as various types of cable communications modules such as a USB, high definition multimedia interface (HDMI), digital visual interface (DVI), recommended standard 232 (RS-232), power line communications, and plain old telephone service (POTS).

The wireless communications module may include a wireless communications module that supports a wireless fidelity (Wi-Fi) module and a wireless broadband as well as global system for mobile communication (GSM), CDMA, WCDMA, universal mobile telecommunications system (UMTS), TDMA, and LTE.

In the above, the process of determining an SOC of the battery 600 when the first clutch 210 and the second clutch 220 are open due to overheating of the transmission 200 and controlling rotation of the motor 500 to cool the transmission 200 based on the determined SOC of the battery 600 has been described using each of the elements of the hybrid vehicle 1 with reference to FIGS. 4 and 5.

Figure 6:
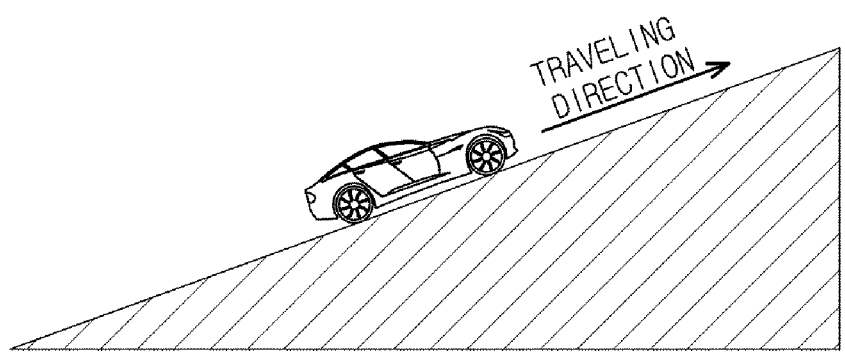
FIG. 6 is a view for describing a process in which a transmission of the hybrid vehicle becomes overheated according to an embodiment.

FIG. 6 is a view for describing a process in which a transmission of the hybrid vehicle becomes overheated according to an embodiment.

The transmission 200 of the hybrid vehicle 1 is typically overheated when the hybrid vehicle 1 is climbing up an uphill road as illustrated in FIG. 6. Particularly, the transmission 200 may be overheated when attempting to maintain a "hill hold" state or "creep driving" is performed while driving on an uphill road. Here, description will be given by assuming the transmission 200 as an automatic transmission.

In a case of a vehicle with an automatic transmission, a driver sometimes maintains a so-called "hill hold" state by only using an accelerator pedal (a brake pedal is off) to prevent the vehicle from moving backward.

When the "hill hold" state is maintained, a vehicle with an automatic transmission has no problems because a torque converter is disposed therein. However, in a vehicle with a DCT, overheating occurs due to continuous slipping of a clutch.

Meanwhile, slipping of a clutch refers to a state in which an engine idly rotates and acceleration does not occur when a vehicle suddenly accelerates or is being driven on an uphill road. In this case, a friction force of a clutch is not sufficient and power of the engine is not transmitted.

That is, because a driver tends to maintain a hill hold state by only stepping on an accelerator pedal on an uphill road, a clutch is overheated due to continuous slipping of the clutch in a case of a vehicle with a DCT.

Also, "creep driving" is driving in which a vehicle is prevented from moving backward on an uphill road by a predetermined friction force applied with respect to the uphill road even without stepping on an accelerator pedal and a brake pedal. When a driver steps on the accelerator pedal while the predetermined friction force is applied, the predetermined friction force is automatically released, and the creep driving of the vehicle is switched to normal driving. A clutch is overheated also in this case due to the friction force of the clutch.

As in a case described above, the overheating of the transmission 200 of the hybrid vehicle 1 may typically occur when driving at a low speed on an uphill road, and when the first clutch 210 and the second clutch 220 of the transmission 200 are open, power of the motor 500 is not transmitted to an axle, and a driver may have difficulty controlling the vehicle. To prevent this, the overheated transmission 200 needs be rapidly cooled.

Figure 7:
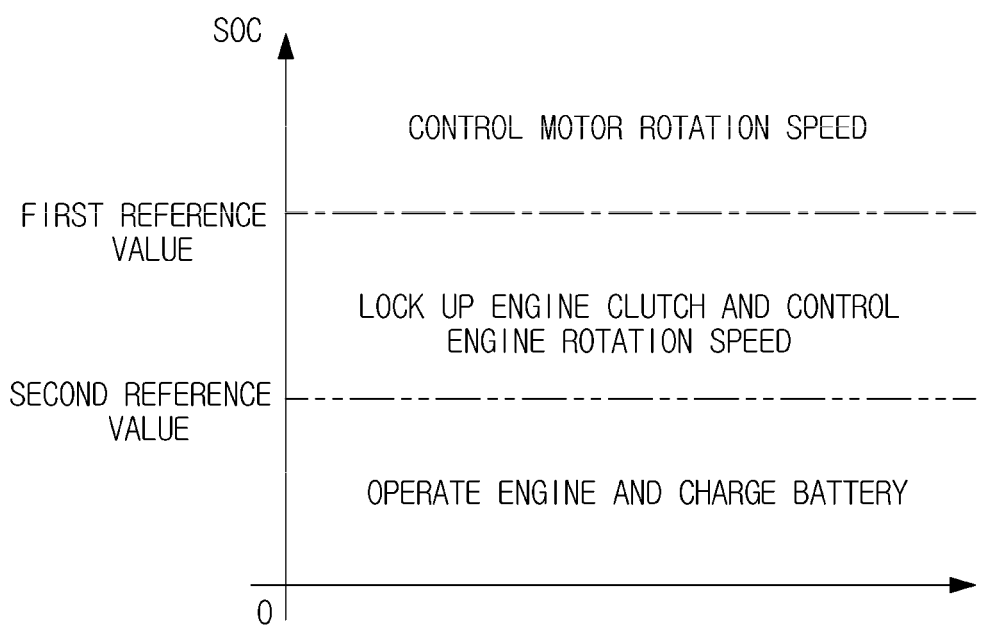
FIG. 7 is a view for describing changes in a method for cooling the transmission according to an SOC of a battery according to an embodiment.

FIG. 7 is a view for describing changes in a method for cooling the transmission according to an SOC of a battery according to an embodiment.

Although it has been described above, a different method may be used to cool the transmission 200 of the hybrid vehicle 1 based on an SOC of the battery 600.

First, the controller 300 may receive information on an SOC of the battery 600 from the battery 600 and determine the SOC of the battery 600.

The SOC of the battery 600 may be classified as the first reference value and the second reference value. The first reference value and the second reference value are differing values that represent an SOC of the battery with a numerical value.

The controller 300 may control a rotational speed of the motor 500 in a different way according to an SOC of the battery 600.

As illustrated in FIG. 7, when the SOC of the battery 600 is the first reference value or higher, it signifies that electrical energy of the battery 600 is sufficient for cooling the transmission 200 only by driving the motor 500. Consequently, the hybrid vehicle 1 may not use power of the engine 400 until the SOC of the battery 600 drops to a value below the first reference value and cool the transmission 200 by convection cooling of air using rotation of the motor 500. Here, the hybrid vehicle 1 may control speed of the motor 500 to be proportional to the SOC of the battery 600.

As illustrated in FIG. 7, when the SOC of the battery 600 is less than the first reference value and equal to or higher than the second reference value, this signifies that electrical energy of the battery 600 is not sufficient enough to cool the transmission 200 only by driving the motor 500.

Consequently, the hybrid vehicle 1 may lock up the engine clutch 450 to connect the engine 400 to the motor 500 and cool the transmission 200 by convection cooling of air using rotation of the motor 500 until the SOC of the battery 600 is dropped to a value below the second reference value. The hybrid vehicle 1 may control the speed of the motor 500 to be proportional to the SOC of the battery 600. In this case, because the power of the engine 400 is used, consumption of the battery 600 may be minimal.

As illustrated in FIG. 7, when the SOC of the battery 600 is less than the second reference value, this signifies that the electrical energy of the battery 600 is not sufficient enough to cool the transmission 200 only by driving the motor 500 and that the battery 600 needs to be charged.

Consequently, the hybrid vehicle 1 may charge the battery 600 by the HSG 700 using power of the engine 400 so that the SOC of the battery 600 reaches at least the second reference value, lock up the engine clutch 450 to connect the engine 400 to the motor 500, and cool the transmission 200 by convection cooling of air using rotation of the motor 500 by the power of the engine 400 at the same time. The hybrid vehicle 1 may control the speed of the motor 500 to be proportional to the SOC of the battery 600. In this case, the battery 600 may be charged using the power of the engine 400, and the transmission 200 may be cooled.

In the above, a method of cooling the transmission 200 of the hybrid vehicle 1 according to an SOC of the battery 600 has been described.

FIG. 8 is a view for describing a condition in which a transmission cooling process may start according to an embodiment.

When the first clutch 210 and the second clutch 220 are expected to be open due to overheating of the transmission 200 while the hybrid vehicle 1 is being driven, because it signifies that a failure mode of the hybrid vehicle 1 is recognized as illustrated in FIG. 8, the controller 300 controls a vehicle stop guidance message to be displayed through the display 800.

This may be viewed as a first condition for the hybrid vehicle 1 to start a convection cooling process for cooling the transmission 200. This is to stop the vehicle before the first clutch 210 and the second clutch 220 are open because power of the motor 500 is not transmitted to an axle and the driver cannot drive as intended when the first clutch 210 and the second clutch 220 are open.

Also, when it is determined that the first condition is satisfied, the controller 300 may control the first clutch 210 and the second clutch 220 of the transmission 200 to be open and control a gear stage of the transmission 200 to be shifted to a P-stage or an N stage before the motor 500 is rotated to cool the transmission 200. This is because a sudden unintended acceleration of the vehicle may occur when the transmission 200 is cooled and the first clutch 210 and the second clutch 220 are locked up.

This may be viewed as a second condition for the hybrid vehicle 1 to start a convection cooling process for cooling the transmission 200. In other words, the first condition and the second condition described above may be conditions for the hybrid vehicle 1 to start convection cooling.

As described above, when the first condition and the second condition are satisfied, the controller 300 may at last control rotation of the motor 500 to perform convection cooling of the transmission 200. However, conditions for starting convection cooling is not limited thereto. The conditions are for ensuring safety of a driver and a fellow passenger. The conditions may be omitted because safety of the driver and the fellow passenger may also be sufficiently protected by other functions.

Figure 9:
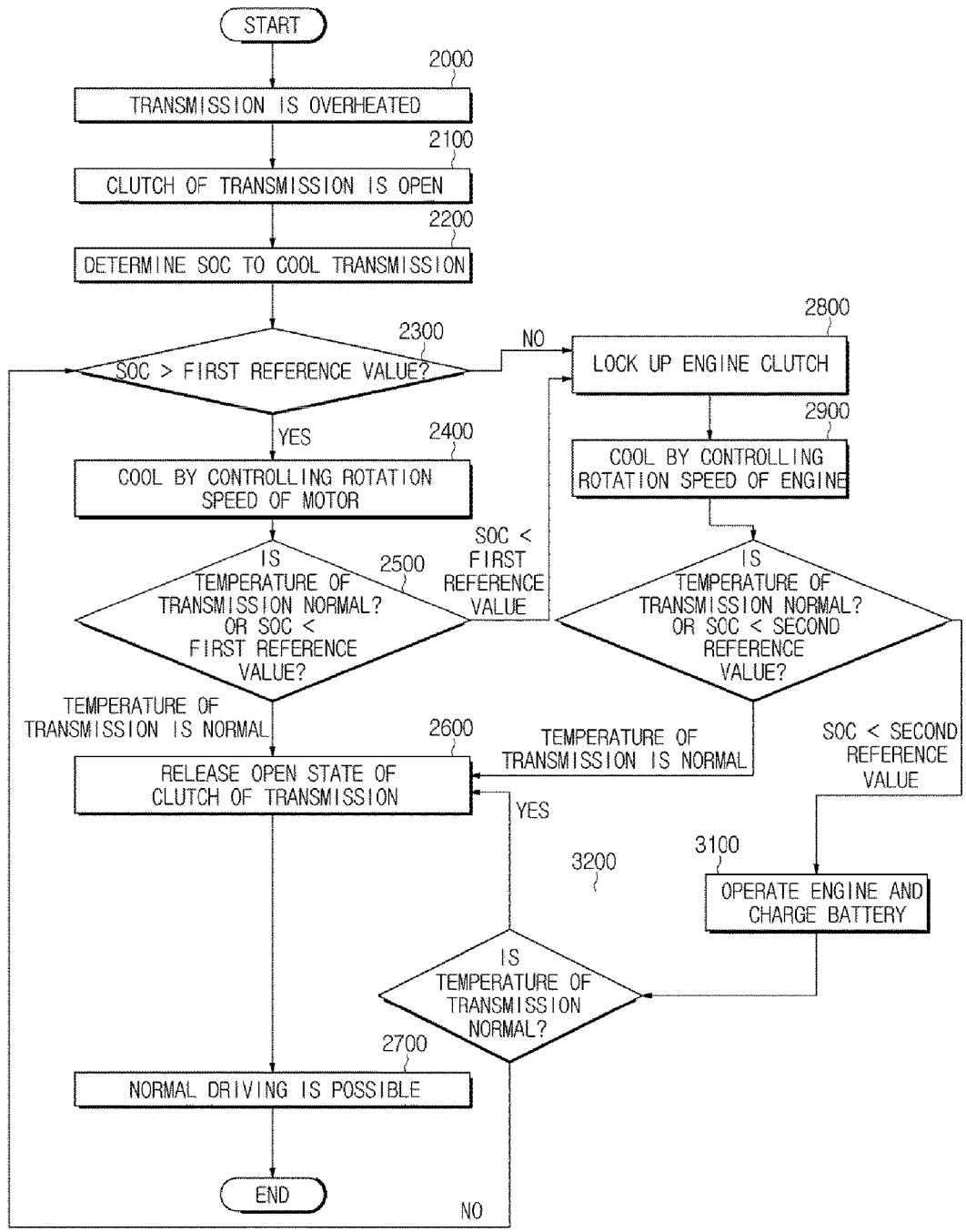
FIG. 9 is a flowchart for describing a method of controlling a hybrid vehicle according to an embodiment.

FIG. 9 is a flowchart for describing a method of controlling a hybrid vehicle according to an embodiment.

Hereinafter, a method of controlling the hybrid vehicle 1 according to an embodiment will be described through the flowchart.

Specifically, a process in which the hybrid vehicle 1 rapidly and efficiently cools the transmission 200 when the first clutch 210 and the second clutch 220 of the transmission 200 are open due to overheating of the transmission 200 will be described.

First, when the transmission 200 is determined to be an overheated state by the transmission overheat sensor 230 (2000), the hybrid vehicle 1 opens the first clutch 210 and the second clutch 220 to prevent damages of the first clutch 210 and the second clutch 220 (2100). That is, a connection between the first clutch 210 and the second clutch 220 and the motor 500 are released.

Then, the hybrid vehicle 1 determines information on an SOC of the battery 600 to determine a method of cooling the transmission 200 according to the SOC of the battery 600 (2200).

When the SOC of the battery 600 is determined to be the first reference value (YES to 2300) according to a result of determination by the hybrid vehicle 1, the hybrid vehicle 1 controls rotation of the motor 500 to cool the transmission 200. Here, the hybrid vehicle 1 may control a driving speed of the motor 500 to be proportional to the SOC of the battery 600 to perform convection cooling of the transmission 200 (2400).

The hybrid vehicle 1 periodically determines whether a temperature of the transmission 200 is normal or the SOC of the battery 600 is less than the first reference value while continuing convection cooling (2500).

When the temperature of the transmission 200 is determined as normal after convection cooling (YES to "Is temperature of the transmission normal?" of 2500) according to a result determined by the hybrid vehicle 1, the hybrid vehicle 1 may release the open state of the first clutch 210 and the second clutch 220 of the transmission 200 (2600). That is, the hybrid vehicle 1 locks up the first clutch 210 and the second clutch 220 to the motor 500 again and enables normal driving of the vehicle (2700).

However, when the SOC of the battery 600 is determined to be less than the first reference value (NO to 2300, YES to "SOC<First reference value?" of 2500), the hybrid vehicle 1 locks up the engine clutch 450 to connect the engine 400 to the motor 500 (2800).

This is to control rotation of the motor 500 to cool the transmission 200 by using power of the engine 400 to minimally consume the battery 600.

In this case, the hybrid vehicle 1 may rotate the motor 500 by using power of the engine 400, i.e., by controlling rotation speed of the engine, to perform convection cooling of the transmission 200 (2900). Here, because rotation of the motor 500 is performed proportional to a controlled rotation speed of the engine, a speed of cooling the transmission 200 depends on the controlled rotation speed of the engine.

Then, the hybrid vehicle 1 periodically determines whether a temperature of the transmission 200 is normal or the SOC of the battery 600 is less than the second reference value while continuing convection cooling (3000).

When the temperature of the transmission 200 is determined as normal after convection cooling (YES to "Is temperature of the transmission normal?" of 3000) according to a result determined by the hybrid vehicle 1, the hybrid vehicle 1 may release the open state of the first clutch 210 and the second clutch 220 of the transmission 200 (2600). That is, the hybrid vehicle 1 locks up the first clutch 210 and the second clutch 220 to the motor 500 again and enables normal driving of the vehicle (2700).

However, when the SOC of the battery 600 is determined to be less than the second reference value (YES to "SOC<Second reference value?" of 2500), the hybrid vehicle 1 locks up the engine clutch 450 to connect the engine 400 to the motor 500, performs convection cooling of the transmission 200 by controlling rotation of the motor 500 by power of the engine 400 to cool the transmission 200, and charges the battery 600 by the HSG 700 by the power of the engine 400 at the same time (3100).

Although it has been described above, this is for charging the battery 600 and cooling the transmission 200 at the same time because the SOC of the battery 600 is less than the second reference value.

Then, when temperature of the transmission 200 is determined as normal after convection cooling (YES to 3200) according to a result determined by the hybrid vehicle 1, the hybrid vehicle 1 may release the open state of the first clutch 210 and the second clutch 220 of the transmission 200 (2600). That is, the hybrid vehicle 1 locks up the first clutch 210 and the second clutch 220 to the motor 500 again and enables normal driving of the vehicle (2700).

However, when the temperature of the transmission 200 is not determined as normal after convection cooling (NO to 3200) according to a result determined by the hybrid vehicle 1, the hybrid vehicle 1 determines an SOC of the battery 600 and repeats the above-described steps until the temperature of the transmission 200 becomes normal (2300).

By the process above, the hybrid vehicle 1 may rapidly and efficiently cool the transmission 2200 by rotation of the motor 500 to reach a normal driving state when the first clutch 210 and the second clutch 220 are open due to overheating of the transmission 200.

In the present specification, a hybrid vehicle that determines an SOC of a battery and controls rotation of a motor to cool a dual clutch transmission based on the determined SOC of the battery when the dual clutch is open due to overheating of the dual clutch transmission, and a method of controlling the same have been described above.

Meanwhile, embodiments disclosed herein may be realized in the form of a recording medium that stores an instruction executable by a computer. An instruction may be stored in the form of a program code. When the instruction is executed by a processor, a program module may be generated and steps of the embodiments disclosed herein may be performed. The recording medium may be a computer readable recording medium.

A computer readable recording medium includes all types of recording media in which computer readable instructions are stored. For example, the computer readable recording medium may include a ROM, a RAM, a magnetic tape, a magnetic disk, a flash memory, an optical data storage, and the like.

According to a hybrid vehicle and a method of controlling the same described above, a dual clutch transmission is efficiently and rapidly cooled using rotation of a motor such that an open state of a dual clutch that has occurred due to overheating of the dual clutch transmission can be rapidly released.

Also, according to a hybrid vehicle and a method of controlling the same, a gear stage of a dual clutch transmission is controlled to be neutral when the dual clutch transmission is being cooled using rotation of a motor such that a sudden unintended acceleration is prevented when the dual clutch transmission is cooled and a dual clutch is locked up.

Embodiments disclosed herein have been described with reference to the accompanying drawings. One of ordinary skill in the art to which the present disclosure pertains should understand that the present disclosure may be executed in a different form from the disclosed embodiments. The embodiments disclosed herein are illustrative and should not be construed as limiting.

What is claimed is:

1. A hybrid vehicle comprising:
   a battery configured to store electrical energy;
   a motor configured to rotate using the electrical energy;
   a transmission including a first clutch and a second clutch that are connectable to the motor; and
   a controller configured to control rotation of the motor to cool the transmission when the transmission is determined to be in an overheated state,
   wherein the overheated state of the transmission includes a state in which the first clutch and the second clutch are open.

2. The hybrid vehicle of claim 1, wherein the controller determines a state of charge (SOC) of the battery and controls rotation of the motor to cool the transmission based on a determined result of an SOC of the battery.

3. The hybrid vehicle of claim 2, further comprising:
   an engine configured to generate power; and
   an engine clutch disposed between the engine and the motor and configured to connect or disconnect the engine and the motor.

4. The hybrid vehicle of claim 3, wherein the SOC of the battery is classified as a first reference value and a second reference value, and the first reference value and the second reference value include differing values that represent the SOC of the battery with a numerical value.

5. The hybrid vehicle of claim 4, wherein, when the SOC of the battery is determined to be the first reference value or higher, the controller controls rotation of the motor to cool the transmission.

6. The hybrid vehicle of claim 4, further comprising a hybrid starter generator (HSG) configured to generate the electrical energy by using power of the engine and charge the battery.

7. The hybrid vehicle of claim 4, wherein, when the SOC of the battery is determined to be lower than the first reference value, the controller locks up the engine clutch, connects the engine to the motor, and controls rotation of the motor by using power of the engine to cool the transmission.

8. The hybrid vehicle of claim 6, wherein, when the SOC of the battery is determined to be lower than the second reference value, the controller locks up the engine clutch, connects the engine to the motor, and controls rotation of the motor by using power of the engine to cool the transmission, and charges the battery by using the HSG.

9. The hybrid vehicle of claim 1, wherein, when the first clutch and the second clutch are open, the controller controls a gear stage of the transmission to be neutral.

10. The hybrid vehicle of claim 1, wherein the transmission further includes a transmission overheat sensor configured to determine an overheated state of an inside of the transmission.

11. The hybrid vehicle of claim 1, further comprising a display configured to display information on an overheated state of the transmission when the transmission is overheated.

12. A method of controlling a hybrid vehicle, the method comprising:
    determining an overheated state of a transmission including a first clutch and a second clutch that are connectable to the motor; and
    controlling rotation of a motor to cool the transmission when the transmission is determined to be in an overheated state,
    wherein the determining the overheated state of the transmission includes determining whether the first clutch and the second clutch are open.

13. The method of claim 12, wherein the controlling rotation of the motor to cool the transmission when the transmission is determined to be in the overheated state includes:
    determining an SOC of a battery; and
    controlling rotation of the motor to cool the transmission based on a determined result of an SOC of the battery.

14. The method of claim 12, further comprising controlling a gear stage of the transmission to be neutral when the first clutch and the second clutch are open.

15. The method of claim 13, wherein the controlling rotation of the motor to cool the transmission based on a determined result of an SOC of the battery includes controlling rotation of the motor to cool the transmission when the SOC of the battery is determined to be a first reference value or higher.

16. The method of claim 13, wherein the controlling rotation of the motor to cool the transmission based on a determined result of an SOC of the battery includes:
    connecting an engine to the motor to use power of the engine when the SOC of the battery is determined to be lower than the first reference value; and
    controlling rotation of the motor by using the power of the engine to cool the transmission.

17. The method of claim 13, wherein the controlling rotation of the motor to cool the transmission based on a determined result of an SOC of the battery includes:
    connecting the engine to the motor to use the power of the engine when the SOC of the battery is determined to be lower than a second reference value;
    controlling rotation of the motor by using the power of the engine to cool the transmission; and
    generating electrical energy by power of the engine and charging the battery by the electrical energy.

* * * * *